(12) United States Patent
Tisserand et al.

(10) Patent No.: US 7,756,377 B2
(45) Date of Patent: **\*Jul. 13, 2010**

(54) WAVEGUIDE COMPRISING A CHANNEL ON AN OPTICAL SUBSTRATE

(76) Inventors: Stéphane Tisserand, 8, rue Melchior, F-13003 Marseille (FR); Laurent Roux, 237, avenue de Château-Gombert Les Informelles 1202, F-13013 Marseille (FR); Frank Torregrossa, Hameau Les Putis, F-13109 Simiane Collonge (FR); François Flory, 59, travers Penne, F-13001 Marseille (FR); Ludovic Escoubas, Résidence Les Borromées, Bâtiment X, F-13012 Marseille (FR); Emmanuel Drouard, Parc de la Constance, 116, avenue des Caillols, F-13003 Marseille (FR)

( * ) Notice: Subject to any disclaimer, the term of this patent is extended or adjusted under 35 U.S.C. 154(b) by 92 days.

This patent is subject to a terminal disclaimer.

(21) Appl. No.: 10/450,671

(22) PCT Filed: Dec. 14, 2001

(86) PCT No.: PCT/FR01/04014

§ 371 (c)(1),
(2), (4) Date: Nov. 28, 2003

(87) PCT Pub. No.: WO02/48747

PCT Pub. Date: Jun. 20, 2002

(65) Prior Publication Data

US 2004/0071428 A1      Apr. 15, 2004

(30) Foreign Application Priority Data

Dec. 15, 2000   (FR) .................................. 00 16549

(51) Int. Cl.
*G02B 6/10* (2006.01)
(52) U.S. Cl. ..................... 385/132; 385/129; 385/130
(58) Field of Classification Search ................. 385/14, 385/129–132; 216/24
See application file for complete search history.

(56) References Cited

U.S. PATENT DOCUMENTS 3,785,717 A * 1/1974 Croset et al. ............... 385/132

(Continued)

FOREIGN PATENT DOCUMENTS

EP        0 380 138        8/1990

(Continued)

OTHER PUBLICATIONS

Stephane Tisserand et al., Titanium Implantation in Billr and Thin Film Amorphous Silicau Journal of Appl. Physics 1998.

(Continued)

*Primary Examiner*—Michelle R Connelly Cushwa
(74) *Attorney, Agent, or Firm*—Horst M. Kasper

(57) ABSTRACT

The invention provides a waveguide comprising a channel 12 on an optical substrate 11, the refractive index of the channel being higher than that of the substrate. The waveguide includes at least one guide layer 13 arranged on the channel, the index of said guide layer being higher than that of the substrate. In addition, the channel 12 is integrated in the substrate 11. advantageously, the waveguide further includes a covering layer 14 deposited on the guide layer 13, the index of said covering layer being lower than that of the guide layer and lower than that of the channel. The invention also provides a method of fabricating the waveguide.

24 Claims, 3 Drawing Sheets

U.S. PATENT DOCUMENTS

| | | | |
|---|---|---|---|
| 4,789,642 A | | 12/1988 | Lorenzo et al. |
| 4,938,836 A | * | 7/1990 | Carenco et al. ............ 117/8 |
| 5,019,519 A | | 5/1991 | Tanaka et al. |
| 5,354,709 A | * | 10/1994 | Lorenzo et al. ............ 117/8 |
| 5,395,793 A | | 3/1995 | Charbonneau et al. |
| 5,432,881 A | * | 7/1995 | Doi ........................... 385/132 |
| 5,911,018 A | * | 6/1999 | Bischel et al. ............. 385/16 |
| 6,516,127 B1 | * | 2/2003 | Fluck et al. ............... 385/132 |
| 2003/0077060 A1 | * | 4/2003 | Chen et al. ................ 385/129 |
| 2004/0091225 A1 | | 5/2004 | Serand et al. |
| 2008/0315127 A1 | | 12/2008 | Torregrosa et al. |

FOREIGN PATENT DOCUMENTS

| | | | |
|---|---|---|---|
| EP | 0 510 883 | | 10/1992 |
| GB | 2 306 694 | | 5/1997 |
| GB | 2306694 | | 5/1997 |
| GB | 2306694 A | * | 7/1997 |

OTHER PUBLICATIONS

Webb and Townsend,, Refractive Index Profiles Induced By ION Implantation . . . Appl. Phys, 1976.

"Strip-Loaded Waveguide Using an Underlayer" K.V. Avudainay—Agam and A. Selvaratan, Optics Letter vol. 12, No. 6, pp. 663-666.

U.S. Appl. No. 12/308,446, dated Dec. 15, 2008, Frank Torrerosa et al.

* cited by examiner

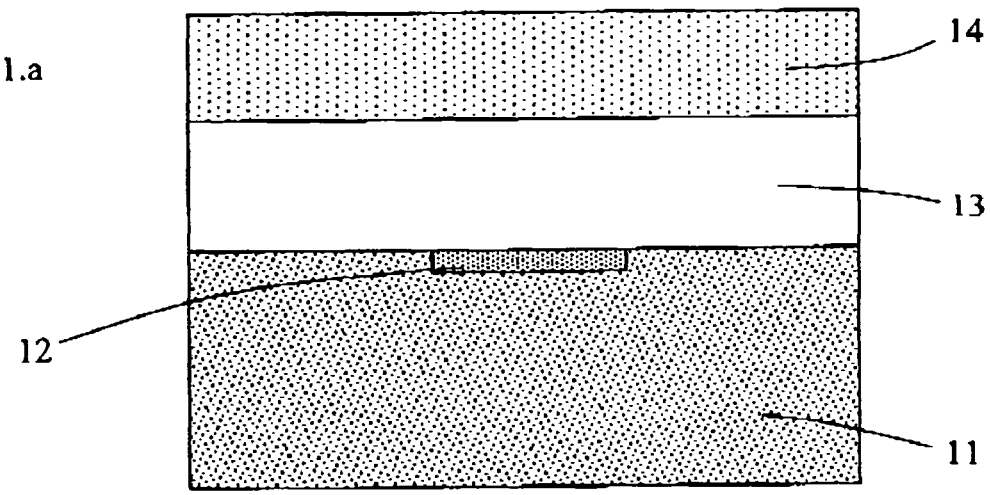
Figure 1.a
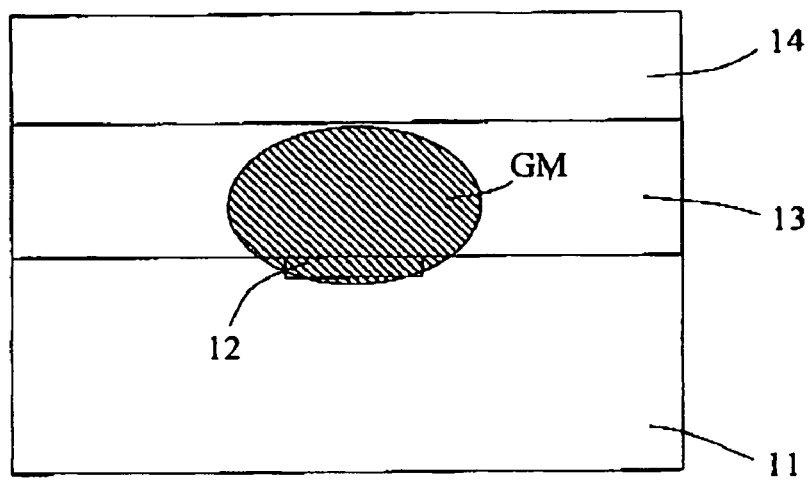
Figure 1.b
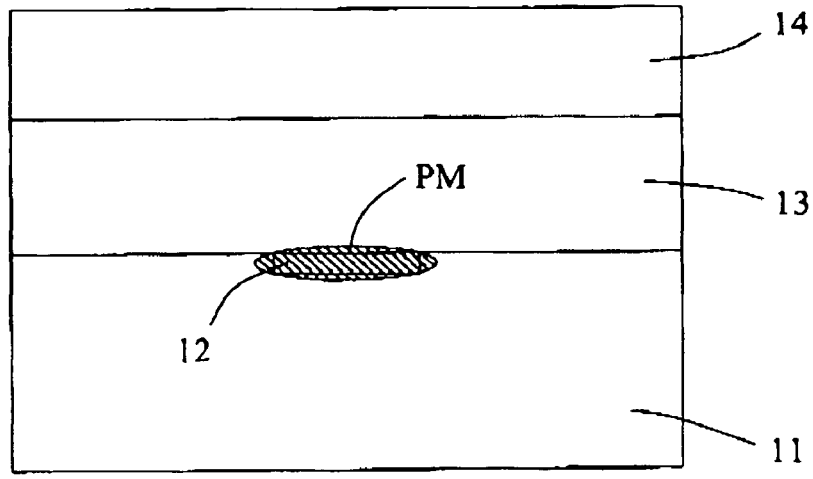
Figure 1.c

Figure 2.a
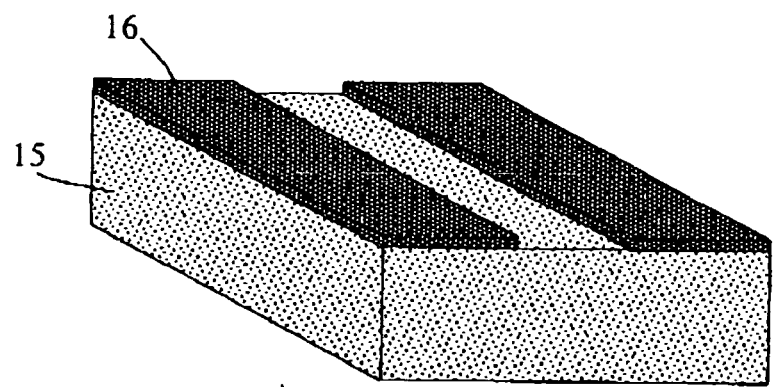
Figure 2.b
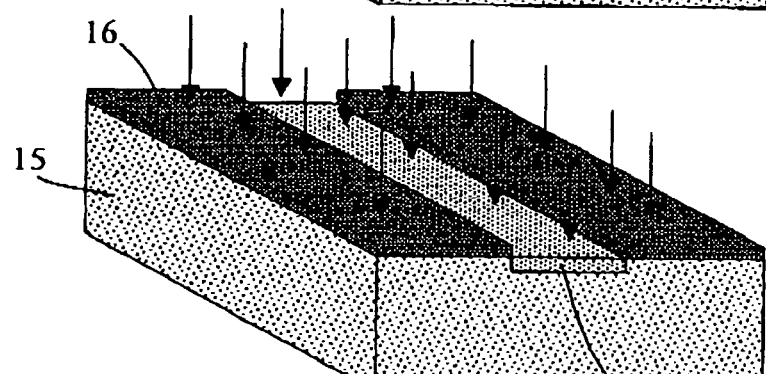
Figure 2.c
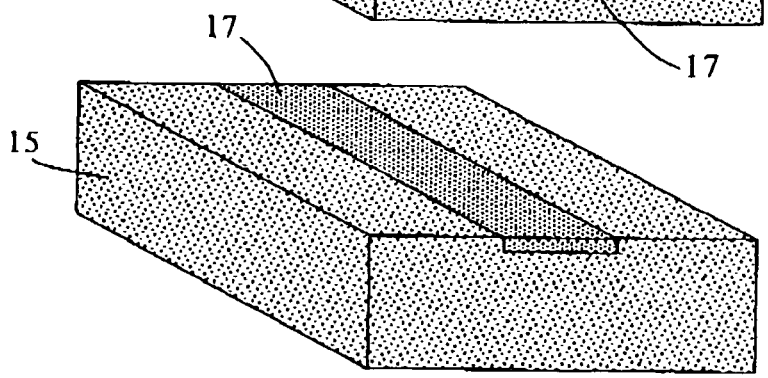
Figure 2.d
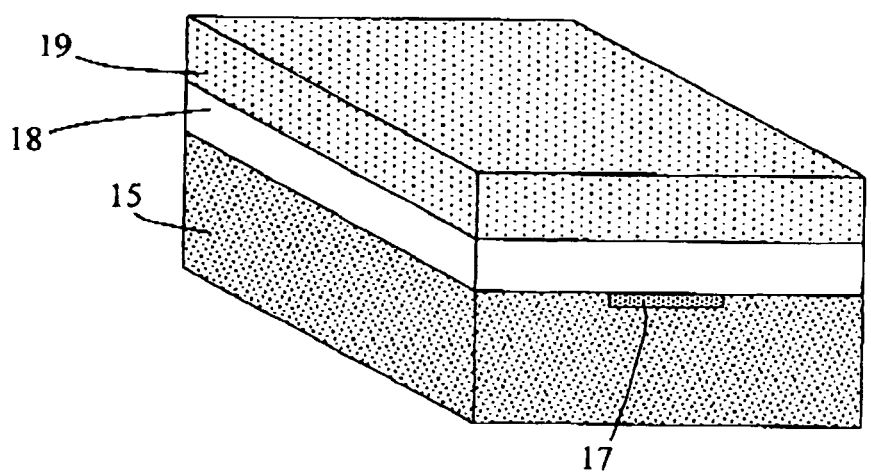

Figure 3.a
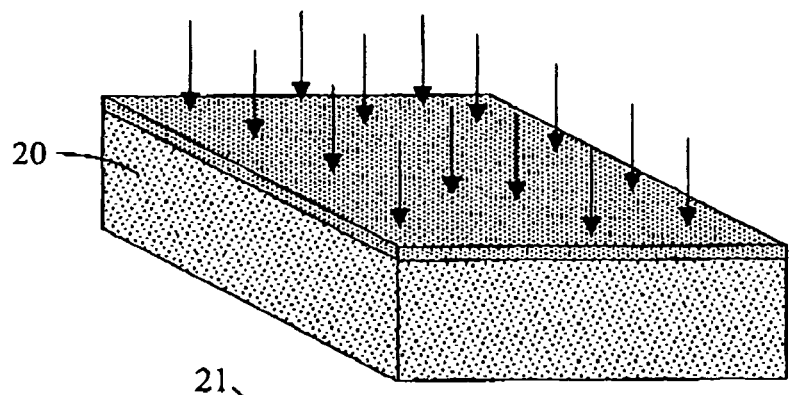
Figure 3.b
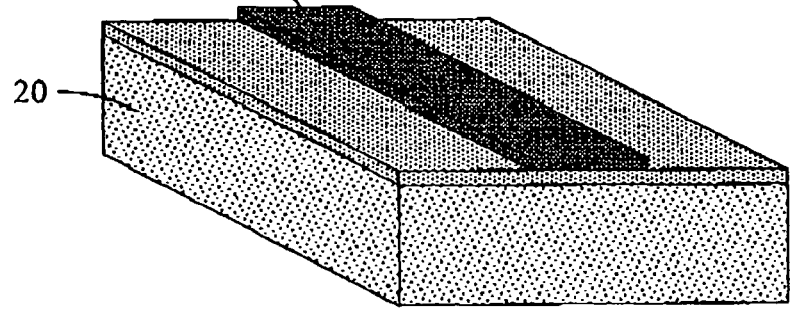
Figure 3.c
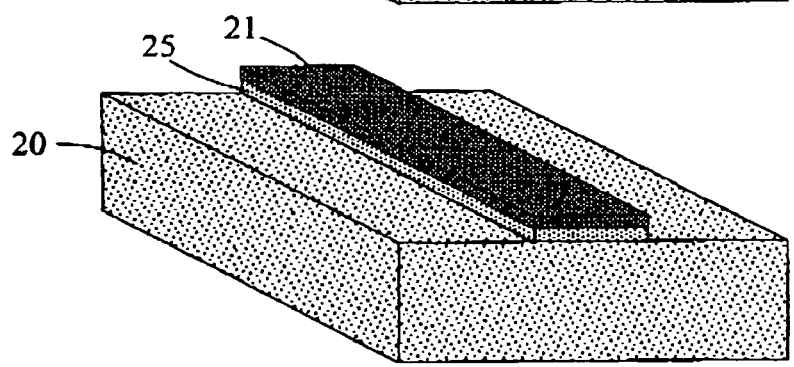
Figure 3.d
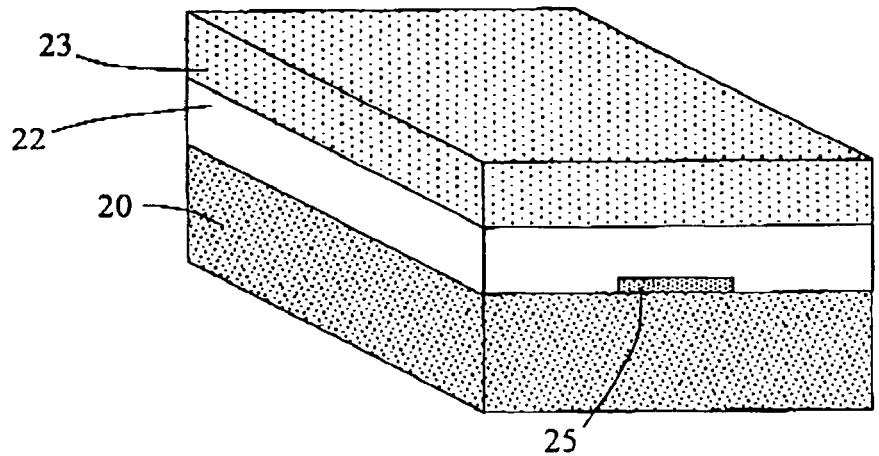

WAVEGUIDE COMPRISING A CHANNEL ON AN OPTICAL SUBSTRATE

The present invention relates to a waveguide comprising a channel on an optical substrate.

The field of the invention is that of integrated optics on a substrate, in which field an essential element is the waveguide which serves to convey light energy. Such a waveguide is made by creating a channel on the substrate having a refractive index that is higher than the refractive index of the surrounding medium.

Several methods have been proposed for making a waveguide.

A first method implements thin layer technology. Generally, the substrate is made either of silica or of silicon on which a thermal oxide has been grown so that on its top face the optical substrate is silicon dioxide. As in document EP 0 510 883, a first layer is deposited on its optical substrate by means of any known technique such as flame hydrolysis deposition, high or low pressure chemical vapor deposition, optionally with plasma assistance, vacuum evaporation, cathode sputtering, or deposition by centrifuging. The layer is then etched in order to define a passive guide layer. Thereafter, a second layer is deposited which is often made of doped silicon dioxide, of silicon oxy-nitride, or of silicon nitride, the use of polymers or of sol-gels also being known. A mask defining a channel is then applied to said layer by means of a photolithographic technique. Thereafter, the channel is made by a chemical etching method or by dry etching such as plasma etching, reactive ion etching, or ion beam etching. The mask is withdrawn after etching, and commonly a covering layer is deposited on the substrate to bury the channel. The covering layer has a refractive index lower than that of the channel and it is provided to limit the disturbances exerted by the surrounding medium, in particular disturbances due to moisture.

In a variant of that method proposed in document GB 2 306 694, the channel is made directly on the optical substrate by deposition and etching and then the guide layer is deposited.

In any event, that method requires at least one etching operation which is difficult to control both in terms of spatial resolution and in terms of the surface state of the flanks of the channel. Unfortunately, these characteristics directly determine the propagation losses of the waveguide.

A second method implements ion exchange technology. In this case, the substrate is a glass containing ions that are mobile at relatively low temperature, for example a silicate glass containing sodium oxide. The substrate is likewise provided with a mask, and it is then immersed in a bath containing polarizable ions such as silver or potassium. The channel is thus made by increasing the refractive index due to exchanging polarizable ions with the mobile ions of the substrate. Then, in general, the channel is buried by applying an electric field perpendicular to the face of the substrate.

That method is very simple. However, it requires a particular type of substrate to be used which does not necessarily have all of the desired characteristics. In addition, because the ions diffuse laterally to a considerable extent, spatial resolution is also seriously limited.

A third method uses ion implantation technology. As in thin layer technology, the top face of the substrate is often silicon dioxide. A mask is likewise applied to the optical substrate and the channel is made by implanting ions in the masked substrate. After the mask has been removed, an annealing operation is performed in order to eliminate crystal structure defects and absorbant colored centers, so as to stabilize the new chemical compounds, and return the channel to stoichiometric balance, thus limiting losses in the waveguide.

That method makes it possible to obtain a high refractive index for the channel, e.g. by implanting nitrogen as mentioned in the article by A. P. Webb and P. D. Townsend, "Refractive index profiles induced by ion implantation into silica", Journal of Physics D: Applied Physics, 1976, pp. 1343-1354. The value of the index can be further increased by implanting titanium, according to the article by S. Tisserand, F. Flory, A. Gatto, L. Roux, M. Adamik, I. Kovacs, Journal of Applied Physics, 1998, Vol. 83, No. 10, 5150. It also makes it possible to obtain waveguides presenting low propagation losses, as mentioned in U.S. Pat. No. 4,521,443.

The third method is satisfactory concerning the geometrical specifications of the channel. Nevertheless, since implantation energy lies in the range a few tens to a few hundreds of kilo electron volts (KeV), the penetration depth of implanted ions hardly exceeds a few hundreds of nanometers (nm). Channels of that thickness are too thin to obtain an acceptable coupling coefficient with an optical fiber. The monomode fibers used in particular in telecommunications for conveying an infrared signal (typical wavelength 1.3 microns ($\mu$m) or 1.55 m) have a core with a diameter of about 10 m.

An object of the present invention is thus to provide an optical waveguide having satisfactory spatial resolution and a good coupling coefficient with ordinary optical fibers.

According to the invention, a waveguide comprises a channel on an optical substrate with the refractive index of the channel being higher than that of the substrate, and it comprises at least one guide layer arranged on the channel, the index of the guide layer being higher than that of the substrate; in this waveguide, the channel is integrated in the substrate.

Since the waveguide is not limited to a single channel, but is rather constituted by associating said channel with the guide layer, it presents dimensions that are compatible with those of the core of an optical fiber.

Preferably, the waveguide includes at least one covering layer deposited on the guide layer, the index of the covering layer being lower than that of the guide layer and lower than that of the channel.

Advantageously, the index of the guide layer is equal to that of the as multiplied by a factor higher than 1.001.

By way of example, the thickness of the set of guide layers lies in the range 1 $\mu$m to 20 $\mu$m.

According to a preferred characteristic, the channel results from ion implantation into the substrate.

Furthermore, it is recommended that the face of the substrate into which ion implantation is performed should be made of silicon dioxide.

The invention also provides a method of manufacturing a waveguide on an optical substrate.

In a first variant, the method comprises the following steps:
  making a mask on the optical substrate to define the pattern of a channel;
  implanting ions into the masked substrate; and
  removing the mask;

and the method further comprises a step of depositing at least one guide layer on the substrate, the refractive index of the guide layer being higher than that of the substrate.

In a second variant, the method comprises the following steps:
  implanting ions into the substrate;
  making a mask on the substrate to define the pattern of a channel;

etching the substrate to a depth not less than the implantation step;

removing the mask;

and the method further comprises a step of depositing at least one guide layer on the substrate, the refractive index of the guide layer being higher than that of the substrate.

Advantageously, the method includes a step of annealing the substrate following the step of implanting ions.

This method is also suitable for obtaining a waveguide having the various characteristics mentioned above.

The present invention is described below in greater detail with reference to embodiments given by way of illustration and with reference to the accompanying figures, in which:

FIG. 1 is a diagram of a waveguide;

FIG. 2 shows a first variant of waveguide fabrication; and

FIG. 3 shows a second variant of waveguide fabrication.

With reference to FIG. 1a, the substrate is made of silica or it is made of silicon on which either a thermal oxide layer has been grown, or a layer of silicon dioxide or some other material has been deposited. It thus presents a top face or optical substrate 11 which is commonly made of silicon dioxide having a thickness of 5 µm to 20 µm, for example. The channel 12 made by implanting ions is integrated in the optical substrate, which is itself covered in a guide layer 13. The refractive index of the channel is naturally higher than that of silicon dioxide. The guide layer is 5 µm thick, for example, it is made of doped silicon dioxide, and it presents a refractive index higher than that of the optical substrate, e.g. 0.3% higher. It may possibly be the result of stacking thin layers. Preferably, a covering layer 14, which may likewise be constituted by a stack of thin layers, is also provided on the guide layer 13. The covering layer, which is likewise 5 µm thick, has a refractive index lower than that of the guide layer and lower than that of the channel; in the present case it is made of non-doped silicon dioxide.

The waveguide formed by the association of the channel 12 and the guide layer 13 can accommodate one or more propagation modes having properties that are a function of the optical and geometrical characteristics that are adopted.

With reference to FIG. 1b, when the refractive index of the channel is relatively low, e.g. 1.56, the extended propagation mode GM extends in the guide layer 13. The width of the channel, e.g. 7.5 µm, and the thickness of said guide layer are selected in such a manner that the propagation mode GM is as close as possible to that of optical fibers. It is then possible to obtain a fiber coupling coefficient having a value of 90%. The effective index of the guided mode is lower than the refractive index of the guide layer and lower than that of the channel; it is higher than the refractive index of the top face 11 and higher than that of the covering layer 14.

With reference to FIG. 1c, it should be observed that the waveguide may also support a reduced propagation mode PM close to that which is to be found in implanted waveguides without a guide layer. It is then appropriate for the refractive index of the channel to be relatively high, e.g. 1.90. The width of the channel may be considerably smaller. The effective index of the guided mode is then higher than that of the guide layer and lower than that of the channel. The lateral confinement of the reduced mode PM is very considerable.

It is recalled that ion implantation can be performed nowadays with very high precision concerning the doses of ions that are implanted, typically to within 1%. The silicon dioxide optical substrate has a refractive index which presents little or no variation, so it is possible to obtain very high precision concerning the index of the channel. By way of example, when implanting titanium at a concentration of $10^{16}$ ions per square centimeter ($cm^2$) the precision of the refractive index is to within $10^{-4}$, and at a concentration of $10^{17}/cm^2$ the precision is to within $10^{-3}$. This precision is particularly significant when it is desired to use the extended propagation mode GM, since the index of the channel is a parameter which has a very significant effect on coupling with optical fibers.

With reference to FIG. 2a, a first method of manufacturing the waveguide comprises a first step which consists in making a mask 16 on the optical substrate 15, by means of a conventional photolithographic process. The mask 16 is made of resin, of metal, or of any other material that can constitute an impassable barrier for ions during implantation. The mask may optionally be obtained by a direct writing process.

With reference to FIG. 2b, the channel 17 is produced by implanting ions into the masked substrate. By way of example, when implanting titanium ions, the concentration of implantation lies in the range $10^{16}/cm^2$ to $10^{18}/cm^2$, and the energy of implantation lies in the range a few tens of KeV to a few hundreds of KeV.

With reference to FIG. 2c, the mask is removed, e.g. by means of a chemical etching process. The substrate is then subjected to annealing in order to reduce propagation losses within the channel 17. By way of example, the annealing temperature lies in the range 400° C. to 500° C., and the atmosphere is controlled or else it is constituted by ambient air, and the duration of annealing is of the order of a few tens of hours.

With reference to FIG. 2d, the guide layer 18 is then deposited on the substrate 15 by means of any known technique providing that it leads to a low-loss material having a refractive index that is easily controlled. Finally, the covering layer 19 is optionally deposited on the guide layer 18.

With reference to FIG. 3a, a second method of fabricating the waveguide comprises a first step which consists in implanting the entire optical substrate 20. The concentration and the energy of implantation may be identical to the values specified with reference to the first method.

With reference to FIG. 3b, the following step consists in making a mask 21 on the substrate 20. This mask has the same pattern as that used during in the first method, but it is not subjected to the implantation step.

With reference to FIG. 3c, the channel 25 is obtained by etching the optical substrate to a depth that is not less than the implantation depth. Any conventional etching technique is appropriate providing it leads to acceptable geometrical characteristics for the channel, in particular concerning the profile and the surface state of its flanks. It should be observed at this point that the first method presents the advantage of defining a waveguide whose structure is perfectly plane, since it does not have an etching step. Nevertheless, since the implantation depth is so shallow, the drawbacks inherent to etching are very significantly limited.

With reference to FIG. 3d, the mask is removed and then the substrate is subjected to annealing. The guide layer 22 and optionally the covering layer 23 are then deposited as in the first method.

The implementations of the invention described above have been selected to constitute concrete examples. Nevertheless, it is not possible to list exhaustively all of the ways in which the invention could be implemented. In particular, any step or any means described above could be replaced by an equivalent step or means without going beyond the ambit of the present invention.

The invention claimed is:

1. A waveguide comprising a channel (12, 17, 25) on an optical substrate (11, 15, 20,), the refractive index of the channel being higher than that of the substrate, at least one guide layer (13, 18, 22) being arranged on said channel, the refractive index of said guide layer being higher than that of the substrate, the waveguide being characterized in that said channel (12, 17) is integrated in said substrate (11, 15).

2. A waveguide according to claim 1, characterized in that it includes at least one covering layer (14, 19, 23) disposed on said guide layer (13, 18, 22), the refractive index of said covering layer being lower than that of the guide layer and lower than that of the channel (12, 17, 25).

3. A waveguide according to claim 1 or 2, characterized in that the refractive index of said guide layer (13, 18, 22) is equal to that of the substrate (11, 15, 20) multiplied by a factor greater than 1.001.

4. A waveguide according to claim 1 or 2, characterized in that the thickness of the set of guide layers (13, 18, 22) lies in the range 1 μm to 20 μm.

5. A waveguide according to claim 1 or 2, characterized in that said channel (12, 17, 25) results from implanting ions in said substrate (11, 15, 20).

6. A waveguide according to claim 1 or 2, characterized in that the face of the substrate (11, 15, 20) on which ionic implantation is performed is made of silicon dioxide.

7. A method of fabricating a waveguide on an optical substrate, the method comprising the following steps:
    making a mask (16) on said substrate (15) to define a pattern of a channel (17);
    implanting ions into the masked substrate; and
    removing said mask;
    the method being characterized in that it further comprises a step of depositing at least one guide layer (18) on the substrate, the refractive index of said guide layer being higher than that of the substrate.

8. A method according to claim 7, characterized in that it includes a step of annealing the substrate (15, 20) following the ion implantation step.

9. A method of fabricating a waveguide on an optical substrate, the method comprising the following steps:
    implanting ions into the substrate (20);
    making a mask (21) on said substrate to define a pattern of a channel (25);
    etching the substrate to a depth not less than the implantation step;
    removing said mask;
    the method being characterized in that further comprises a step of depositing at least one guide layer (22) on the substrate, the refractive index of said guide layer being higher than that of the substrate.

10. A method according to claim 7 or claim 9, characterized in that it further comprises a step of depositing a covering layer (19, 23) on said guide layer (18, 22), the refractive index of said covering layer being lower than that of the guide layer and lower than that of the channel (17, 25).

11. A method according to claim 7 or claim 9, characterized in that the refractive index of said guide layer (18, 22) is equal to the refractive index of the substrate (15, 20) multiplied by a factor greater than 1.001.

12. A method according to claim 7 or claim 9, characterized in that the thickness of the set of guide layers (18, 22) lies in the range 1 μm to 20 μm.

13. A method according to claim 7 or claim 9, characterized in that the face (15, 20) of the substrate into which ions are implanted is made of silicon dioxide.

14. A method according to claim 7 or claim 9, further comprising the step: annealing the substrate (15, 20) following the ion implantation step and following to the mask removal step at a temperature in the range of 400 degrees centigrade to 500 degrees centigrade for a few tens of hours.

15. The method according to claim 9, further including a step of
    annealing the substrate (15, 20) following the ion implantation step and following to the mask removal step at a temperature in the range of 400 degrees centigrade to 500 degrees centigrade for a few tens of hours;
    depositing a covering layer (19, 23) on said guide layer (18, 22), the refractive index of said covering layer being lower than that of the guide layer and lower than that of the channel (17, 25);
        rendering the refractive index of said guide layer (18, 22) equal to the refractive index of the substrate (15, 20) multiplied by a factor greater than 1.00 1;
        limiting the thickness of the layer (18, 22) to a range of from about 1 μm to 20 μm;
        furnishing a face (15, 20) of the substrate into which ions are implanted made of silicon dioxide.

16. A waveguide comprising
    a silica optical substrate;
    a waveguide channel (12, 17, 25) generated by metal ion implantation and integrated in the silica optical substrate (11, 15, 20), wherein the refractive index of the waveguide channel is higher than that of the adjacent silica optical substrate;
    a transparent guide layer (13, 18, 22) disposed on said waveguide channel and silica optical substrate, wherein the refractive index of said transparent guide layer is higher than that of the silica optical substrate and wherein the dimensions of the transparent guide layer are compatible with the core of an optical fiber,
    a covering layer (14, 19, 23) disposed on the transparent guide layer, wherein the index of refraction of said covering layer is lower than that of the transparent guide layer and lower than that of the waveguide channel.

17. The waveguide according to claim 16, wherein an outer surface of the waveguide channel disposed relative remote to the silica optical substrate is coplanar to a surface of the silica optical substrate carrying the waveguide channel.

18. The waveguide according to claim 16, wherein the waveguide channel is disposed countersunk relative to a surface of the silica optical substrate carrying the waveguide channel.

19. The waveguide according to claim 16, wherein said waveguide channel (12, 17, 25) results from implanting titanium ions into said silica optical substrate (11, 15, 20) in an area destined to become the waveguide channel furnishing the waveguide.

20. The waveguide according to claim 16, wherein said waveguide channel (12, 17, 25) contains implanted metal ions.

21. The waveguide according to claim 20, wherein said silica optical substrate (11, 15, 20) surrounding the waveguide channel is essentially free from implanted ions.

22. The waveguide according to claim 16, wherein the silica optical substrate is made of an essentially uniform material.

23. The waveguide according to claim 16, wherein the silica optical substrate is silica grown on silicon.

24. The waveguide according to claim 16, wherein
    the silica optical substrate is made of a single kind of material;
    wherein the waveguide channel has a structure of an elongated flat rectangular shaft;

wherein flat wide sides of the rectangular shaft are disposed parallel to a surface of the silica optical substrate;
wherein the waveguide channel is recessed into the silica optical substrate;
wherein an outer flat wide side of the rectangular shaft adjoins and continues an outer face of the silica optical substrate in a plane;
wherein an inner flat wide side of the rectangular shaft is defined by an upward jump in index of refraction relative to an adjacent index of refraction of the silica optical substrate;
wherein a first narrow side of the rectangular shaft is defined by an upward jump in index of refraction relative to an adjacent index of refraction of the silica optical substrate.
wherein a second narrow side of the rectangular shaft is defined by an upward jump in index of refraction relative to an adjacent index of refraction of the silica optical substrate.

* * * * *